US010400152B2

(12) United States Patent
Clapper

(10) Patent No.: US 10,400,152 B2
(45) Date of Patent: Sep. 3, 2019

(54) LIQUID LOADED POWDERS MADE FROM HYBRID CALCIUM CARBONATE FOR OIL AND GAS DRILLING FLUIDS

(71) Applicant: BAKER HUGHES INCORPORATED, Houston, TX (US)

(72) Inventor: Dennis K. Clapper, Houston, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 118 days.

(21) Appl. No.: 15/241,530

(22) Filed: Aug. 19, 2016

(65) Prior Publication Data

US 2018/0051200 A1 Feb. 22, 2018

(51) Int. Cl.
*C09K 8/06* (2006.01)
*C09K 8/035* (2006.01)

(52) U.S. Cl.
CPC ................ *C09K 8/06* (2013.01); *C09K 8/035* (2013.01)

(58) Field of Classification Search
None
See application file for complete search history.

(56) References Cited

U.S. PATENT DOCUMENTS 6,209,646 B1 4/2001 Reddy
2004/0063588 A1 4/2004 Rose et al.
2007/0129258 A1 6/2007 Patel et al.
2010/0193244 A1* 8/2010 Hoskins ................. C09K 8/035 175/5
2012/0065108 A1* 3/2012 Opstal ................... C08F 214/18 507/105
2014/0234427 A1* 8/2014 Gibson ................ A01G 13/065 424/489

FOREIGN PATENT DOCUMENTS

WO 2016115398 A1 7/2016

OTHER PUBLICATIONS

Elabbadi, A. et al., "Sustainable Delivery Systems: Retention of Model Volatile Oils Trapped on Hybrid Calcium Carbonate Microparticles", ACS Sustainable Chemistry & Engineering, 3, pp. 2178-2186 (2015).

* cited by examiner

*Primary Examiner* — Jeffrey D Washville
(74) *Attorney, Agent, or Firm* — Mossman, Kumar & Tyler, P.C.

(57) ABSTRACT

A method for introducing an organic drilling fluid additive into an aqueous drilling fluid in a subterranean formation, where the method includes introducing loaded microparticles into an aqueous drilling fluid. The loaded microparticles are made by absorbing at least one organic drilling fluid additive onto hybrid calcium carbonate microparticles to form loaded microparticles. The method further includes delivering the drilling fluid into a subterranean formation, and optionally shearing the loaded microparticles to release the absorbed drilling fluid additive(s) into the drilling fluid, such as by shearing them at the drill bit.

18 Claims, No Drawings

LIQUID LOADED POWDERS MADE FROM HYBRID CALCIUM CARBONATE FOR OIL AND GAS DRILLING FLUIDS

TECHNICAL FIELD

The present invention relates to methods and compositions for introducing drilling fluid products or additives into a drilling fluid at a remote location; and more particularly relates to compositions and methods for introducing organic drilling fluid products into an aqueous drilling fluid at a remote location using hybrid calcium carbonate powders.

TECHNICAL BACKGROUND

Drilling fluids are typically classified according to their base fluid. In water-based muds, solid particles are suspended in water or brine. Oil can be emulsified in the water. Nonetheless, the water is the continuous phase. Oil-based muds are the opposite or inverse. Solid particles are suspended in oil, and water or brine is emulsified in the oil, and the oil is the continuous phase. Brine-based drilling fluids, of course are a water-based mud in which the aqueous component is brine. It is apparent to those selecting or using a drilling fluid for oil and/or gas exploration that an essential component of a selected fluid is that it be properly balanced to achieve the necessary characteristics for the specific end application. Because drilling fluids are called upon to perform a number of tasks simultaneously, this desirable balance is not always easy to achieve.

It is desirable to use water-based fluids (WBFs) because they often have fewer environmental concerns and are generally less expensive. Nevertheless, there are a number of organic additives or products to WBFs that are useful for introducing into the WBFs including, but not necessarily limited to, lubricants, shale stabilizers, wellbore stabilizers, corrosion inhibitors, oxygen scavengers, rate of penetration (ROP) enhancers, anti-bit balling additives, anti-accretion additives, and combinations thereof. However, because these additives are organic, they may generally be hydrophobic and by nature do not mix well with water, but it should also be appreciated that these chemicals have a range of hydrophobicity and some may be hydrophilic. Introducing them directly into a WBF at the surface generally results in them quickly separating from the WBF.

It would be desirable if drilling fluids and methods for using them could be devised which would easily introduce at least one organic drilling fluid product into an aqueous drilling fluid at a remote location, such as downhole in a subterranean formation.

SUMMARY

There is provided in one non-restrictive version, a method for introducing an organic drilling fluid additive into an aqueous drilling fluid in a subterranean formation, where the method includes introducing loaded microparticles into an aqueous drilling fluid, where the loaded microparticles are made by the process of absorbing at least one organic drilling fluid additive onto hybrid calcium carbonate microparticles to form loaded microparticles. The method additionally includes delivering the aqueous drilling fluid into a subterranean formation. The method may also optionally include shearing the loaded microparticles to release the absorbed drilling fluid additive(s) into the aqueous drilling fluid.

There is additionally provided in another non-limiting embodiment an aqueous drilling fluid which includes water; and a plurality of loaded microparticles made by the process of absorbing at least one organic drilling fluid additive onto hybrid calcium carbonate microparticles to form the loaded microparticles.

DETAILED DESCRIPTION

It has been discovered that a new form of calcium carbonate powder can be used as a carrier for organic drilling fluid products and additives including, but not necessarily limited to, lubricants, shale stabilizers, wellbore stabilizers, corrosion inhibitors, oxygen scavengers, ROP enhancers, anti-bit balling additives, anti-accretion additives, and combinations thereof. This new form of calcium carbonate powder can be made by first precipitating calcium carbonate in the presence of a crystal growth modifier including, but not necessarily limited to, surfactants. A liquid product, such as an organic additive, is then combined with the resulting hybrid calcium carbonate microparticles to produce a dry finished product. It is expected that any non-acid, organic liquid product can be packaged by this method and added to a water-based fluid, in particular an aqueous drilling fluid. This method is expected to be particularly well suited for organic and/or hydrophobic and/or hydrophilic additives such as lubricants and ROP enhancers. For example, these methods and compositions will allow more efficient delivery of a ROP enhancer to a drill bit face. The loaded hybrid calcium carbonate micro-particles will be broken up by the high shear at the drill bit face and release the additive where it is needed most. This physical pulverization of the hybrid calcium carbonate microparticles occurs as they exit the drill string and are contacted by the surfaces of the drill bit. Other delivery methods include, but are not limited to, crushing the microparticles between the drill string and the wellbore.

As described in the article by A. Elabbadi, et al., "Sustainable Delivery Systems: Retention of Model Volatile Oils Trapped on Hybrid Calcium Carbonate Microparticles", *ACS Sustainable Chemistry & Engineering*, 2015, 3, 2178-2186, hybrid calcium carbonate microparticles can be made by precipitating calcium carbonate from a solution of calcium chloride and sodium carbonate. The precipitation process includes a third component that can be a surfactant, including, but not necessarily limited to, lecithin or sodium stearate. The purpose of the surfactant is to modify the crystal growth of the precipitated calcium carbonate to create crystals types that are suitable as carriers for organic materials. The finished material is made by mixing of the organic liquid with the hybrid calcium carbonate powder. The finished product is a dry product. This finished product can be used to carry any type of non-acid organic liquid for many organic drilling fluid additives or products including, but not necessarily limited to lubricants, shale stabilizers, wellbore stabilizers, corrosion inhibitors, oxygen scavengers, ROP enhancers, anti-bit balling additives, and anti-accretion additives. In operation, the dry powder can simply be added through the hopper.

Hybrid calcium carbonate ($CaCO_3$) microparticles precipitated in the presence of different amphiphilic additives have a capacity to trap and retain organic materials, such as limonene in a non-limiting embodiment, by adsorption on the particle surface. Elabbadi, et al. discovered that a combination of surface area and chemical affinity of the carrier particle for the liquid is critical to control volatile losses. They found that the specific surface area of the solid carrier particles alone is not a key parameter for good retention of volatiles in the liquid-loaded powders.

The calcium carbonate microparticles described herein are considered "hybrid" because they are inorganic/organic. A route for calcium carbonate formation is precipitation of carbonate precursor salts and calcium. A calcium solution is contacted with a carbonate solution so that supersaturation is reached when the ionic product of the slurry is higher than the solubility product of the $CaCO_3$, i.e. $K_{sp}=3.36\times10^{-9}$. Under these conditions $CaCO_3$ precipitation occurs spontaneously. Amorphous calcium carbonate, which is an unstable phase, first forms before being transformed into the most stable polymorph, namely calcite. The transformation of amorphous calcium carbonate into calcite ensues by a mechanism of dissolution and recrystallization. Calcium carbonate has three different crystalline polymorphs: calcite (rhombohedral lattice and cubic shape), which is the most stable; aragonite (orthorhombic lattice and needle-like shape), which is relatively less stable; and vaterite (hexagonal lattice and generally spherical shape), which is the most unstable.

Whichever $CaCO_3$ polymorph initially forms, aging of the particles in their native slurry generally leads to their transformation into calcite, which is the most thermodynamically stable polymorph. Therefore studying the process and timely quenching of the reactions are important in order to understand the effect of crystalline phase and resulting surface area and surface structures on the oil adsorption capacity.

Crystallization of $CaCO_3$ is believed to occur in two stages of nucleation and growth. During nucleation the solutes begin to associate into nanometer-scale clusters to form nuclei until a critical size is reached. If they are unstable, the nuclei do not reach the critical size and instead re-dissolve. It is during the nucleation stage that the atoms arrange to initiate the crystallographic structure of the forming crystal. The stage of crystal growth corresponds to the subsequent growth of the stable nuclei by uptake of the solutes in the solvent. Growth continues as long as the supersaturation exists. Depending on the conditions, either nucleation or growth can be predominant, and therefore, different crystal shapes and sizes can be result. Because the crystal lattice and therefore the crystalline structure is determined throughout the nucleation stage, any "external" or "foreign" compound added during nucleation can be included in the structure and can thus modify the crystalline phase. In particular, because the (001) planes of the primary amorphous $CaCO_3$ nuclei are positively charged any negatively charged compound added during the beginning stages of the crystallization can be expected to interact with the nuclei and thus be included in the crystal structure.

Elabbadi, et al. investigated the formation and behavior of hybrid $CaCO_3$ particles precipitated in the presence of different amphiphilic additives, and evaluated their capacity to trap and retain volatile organic liquids using limonene as an exemplary volatile oil. Hybrid $CaCO_3$ particles were prepared by co-precipitating the precursor carbonate ion solutions and calcium in the presence of low and high molecular weight amphiphilic compounds, for example lecithin, sodium stearate, and acacia gum, a protein/polysaccharide polyampholyte.

That is, neat calcium carbonate microparticles and hybrid inorganic/organic $CaCO_3$ particles were formed by Elabbadi, et al. using three different amphiphilic crystallization modifiers added during the precipitation step: (1) lecithin, (2) sodium stearate, and (3) acacia gum. Lecithin is a naturally occurring emulsifier or surfactant composed of fatty acid hydrophobic chains and a zwitterionic head group comprising a phosphate group (negatively charged) and a quaternary amine (positively charged). Phosphate groups can interact with calcium ions, promoting incorporation of the phospholipid into the $CaCO_3$ structure. Additionally, the fatty acid chain is expected to increase the affinity of the particles for the oil phase. (2) Sodium stearate, fatty acid monolayers, were previously used to precipitate interfacial films of crystalline and amorphous calcium carbonate. Sodium stearate was the most hydrophobic of the additives studied by Elabbadi, et al., and they expected that fatty acids present on metal salt particles to strongly influence the wetting properties due to the presence of long hydrocarbon chains. (3) Acacia gum, also known as gum arabic, is a macromolecular amphiphile containing both protein and polysaccharide subunits and is negatively charged at the pH values of interest in the aqueous phase.

Elabbadi, et al. discovered an improvement in organic liquid retention properties of the inorganic carrier, calcium carbonate, through the generation of composite carriers and modification of the gas/liquid partitioning using highly hydrophobic, low volatility (co)solvents. They found that chemical modification of the particles by co-precipitation with hydrophobic surfactants such as sodium stearate or lecithin resulted in particles with different physical characteristics including specific surface area, crystalline phase, morphology, and moisture content. Composite carrier particles were found to have a higher affinity for volatile flavor and fragrance molecules, such as limonene. This makes them attractive candidates for powder/liquid blending. By monitoring of the volatile loss over time, plated samples prepared with lecithin or sodium stearate-modified $CaCO_3$ were discovered to retain about 50% more limonene after 3 months of storage as compared to conventional, pure calcium carbonate.

In contrast, acacia gum-modified $CaCO_3$ did not have any retention effect with limonene, as compared to conventional $CaCO_3$. Elabbadi, et al. attributed this result to the interaction between fatty acid chains and the volatile molecules. It was found that this effect can also be imitated without chemical modification by adding a nonvolatile hydrophobic solvent to the volatile oil prior to plating. They showed that the physicochemical affinity between the carrier and the volatile payload oil or organic liquid is essential for volatile retention, while having a large specific surface area alone is not a sole criterion to formulate and process stable liquid-loaded powders.

Suitable amphiphilic crystallization growth modifiers include surfactants. Suitable surfactants include, but are not necessarily limited to lecithin, sodium stearate, carboxylates, phosphates, sulfates, sulfonates, sulfonated alkanolamides, sulfocarboxylates, sarcocides, betaines, sulfobetaines, combinations thereof, and the like.

The average particle size of the hybrid calcium carbonate microparticles or powders may range from about 1 independently to about 100 microns; alternatively from about 5 independently to about 50 microns be a narrow range. The term "independently" as used herein with respect to a range means that any lower threshold may be used together with any upper threshold to form a suitable alternative range. For instance, an average particle size for the hybrid calcium carbonate powders of from about 1 to about 50 microns would be acceptable.

The specific surface area range for the hybrid calcium carbonate microparticles may be from about 1 independently to about 50 $m^2/g$; alternatively from about 5 independently to about 35 $m^2/g$.

The organic product loading on the hybrid calcium carbonate microparticles may range from about 1% independently to about 50% w/w based on the solid powders; alternatively from about 10% independently to about 30% w/w based on the solid powders.

In the loaded hybrid calcium carbonate microparticles described herein, a wide variety of organic additives and products can be absorbed thereon including lubricants, shale stabilizers, wellbore stabilizers, corrosion inhibitors, oxygen scavengers, ROP enhancers, anti-bit balling additives, anti-accretion additives, and combinations thereof. In one non-limiting embodiment the organic additives are hydrophobic, but it should also be noted that these chemicals have a range of hydrophobicity and some may be hydrophilic. Thus, in various non-limiting embodiments the organic additives are hydrophilic or hydrophobic. Suitable lubricants include, but are not necessarily limited to, mineral oils, vegetable oils, derivatized vegetable oils, animal fats and oils, derivatized animal fats and oils, olefins, paraffins, and combinations thereof. Suitable shale stabilizers include, but are not necessarily limited to, glycols, glycol ethers, and combinations thereof. Suitable wellbore stabilizers, include, but are not necessarily limited to, glycols, glycol ethers, quaternary amines, ethoxylated amines, and combinations thereof. Suitable corrosion inhibitors include, but are not necessarily limited to, amines, imidazolines, dimer acid amine salts, alkyl esters, ethoxylated esters, amidoamines, polyamides, and combinations thereof. Suitable ROP enhancers include, but are not necessarily limited to, mineral oil, vegetable oils, animal fats and oils, olefins, paraffins, polypropylene glycols by themselves and combined with surfactants, and combinations thereof. Suitable anti-bit balling additives include, but are not necessarily limited to, the same materials that may be used as ROP enhancers. Suitable anti-accretion additives include, but are not necessarily limited to, the same materials that may be used as ROP enhancers.

The hybrid calcium carbonate microparticles described here provide more efficient delivery of liquid organic products to remote locations, including, but not necessarily limited to, the bottom of a wellbore, a drill bit face, the wall of a subterranean formation, and the like. These loaded hybrid calcium carbonate microparticles avoid the need for injection methods to control distribution and usage rate. This type of product may be an alternative to products made by spray drying, and may be an alternative method for creation of water-dispersible latex for fluid applications.

In the foregoing specification, the invention has been described with reference to specific embodiments thereof, and has been described as effective for introducing a product into an aqueous drilling fluid in a subterranean formation. However, it will be evident that various modifications and changes can be made thereto without departing from the broader scope of the invention as set forth in the appended claims. Accordingly, the specification is to be regarded in an illustrative rather than a restrictive sense. For example, specific combinations of aqueous fluids, microparticles, carrier fluids, organic products or additives, particle sizes, loading amounts, specific surface areas, dimensions, proportions, materials, and other components falling within the claimed elements and parameters, but not specifically identified or tried in a particular method or composition, are anticipated to be within the scope of this invention. For instance, the methods and compositions described herein are also applicable to aqueous fluids other than drilling fluids including, but are not necessarily limited to, completion fluids, drill-in fluids, workover fluids, and the like. Additionally, there may be other mechanisms for releasing the absorbed drilling fluid additives besides shearing the loaded microparticles, such as at a drill bit. Similarly, it is expected that the methods may be successfully practiced using different loadings, compositions, manufacturing processes, structures, temperature ranges, and proportions than those described or exemplified herein.

The present invention may also suitably consist of or consist essentially of the elements disclosed. Alternatively, the compositions and methods may be practiced in the absence of an element not disclosed. For instance, there may be provided a method for introducing an additive into an aqueous drilling fluid in a subterranean formation, where the method consists essentially of or consists of introducing loaded microparticles into an aqueous drilling fluid, where the loaded microparticles are made by the process of absorbing at least one organic drilling fluid additive onto hybrid calcium carbonate microparticles to form loaded microparticles; delivering the aqueous drilling fluid into the subterranean formation. Optionally, the method may also consist essentially of or consist of shearing the loaded microparticles to release the absorbed drilling fluid additive(s) into the aqueous drilling fluid.

In another non-limiting embodiment, there may be provided an aqueous drilling fluid consisting essentially of or consisting of water and a plurality of loaded microparticles made by a process of absorbing at least one organic drilling fluid additive onto hybrid calcium carbonate microparticles to form the loaded microparticles.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for introducing an organic drilling fluid additive into an aqueous drilling fluid in a subterranean formation, the method comprising:

introducing loaded microparticles into an aqueous drilling fluid, where the loaded microparticles are made by a process of absorbing at least one organic drilling fluid additive onto hybrid inorganic/organic calcium carbonate microparticles to form loaded microparticles, where the hybrid inorganic/organic calcium carbonate microparticles are made by precipitating calcium carbonate in the presence of an amphiphilic crystal growth modifier that is a surfactant; and delivering the aqueous drilling fluid into the subterranean formation.

2. The method of claim 1 where the average particle size of the hybrid inorganic/organic calcium carbonate microparticles ranges from about 1 to about 100 microns.

3. The method of claim 1 where the specific surface area of the hybrid inorganic/organic calcium carbonate microparticles ranges from about 1 to about 50 $m^2/g$.

4. The method of claim 1 where the loading of at least one drilling fluid additive on the hybrid inorganic/organic calcium carbonate microparticles ranges from about 1% to about 50% w/w based on the hybrid calcium carbonate microparticles.

5. The method of claim 1 where the hybrid inorganic/organic calcium carbonate microparticles are dry prior to loading with the at least one drilling fluid additive.

6. The method of claim 1 where the at least one organic drilling fluid additive is selected from the group consisting of lubricants, shale stabilizers, wellbore stabilizers, corrosion inhibitors, oxygen scavengers, ROP enhancers, anti-bit balling additives, anti-accretion additives, and combinations thereof.

7. The method of claim 1 further comprising shearing the loaded microparticles to release the at least one absorbed organic drilling fluid additive into the aqueous drilling fluid.

8. A method for introducing an organic additive into an aqueous drilling fluid in a subterranean formation, the method comprising:

introducing loaded microparticles into an aqueous drilling fluid, where the loaded microparticles are made by a process of absorbing at least one organic drilling fluid additive onto hybrid inorganic/organic calcium carbonate microparticles to form loaded microparticles, and where the hybrid calcium carbonate microparticles are made by precipitating calcium carbonate in the presence of an amphiphilic crystal growth modifier that is a surfactant, where the at least one organic drilling fluid additive is selected from the group consisting of lubricants, shale stabilizers, wellbore stabilizers, corrosion inhibitors, oxygen scavengers, ROP enhancers, anti-bit balling additives, anti-accretion additives, and combinations thereof;

delivering the aqueous drilling fluid into a subterranean formation; and shearing the loaded microparticles to release the at least one absorbed drilling fluid additive into the aqueous drilling fluid.

9. The method of claim 8 where the average particle size of the hybrid inorganic/organic calcium carbonate microparticles ranges from about 1 to about 100 microns.

10. The method of claim 9 where the specific surface area of the hybrid inorganic/organic calcium carbonate microparticles ranges from about 1 to about 50 $m^2/g$.

11. The method of claim 10 where the loading of at least one drilling fluid additive on the hybrid inorganic/organic calcium carbonate microparticles ranges from about 1% to about 50% w/w based on the hybrid calcium carbonate microparticles.

12. The method of claim 8 where the hybrid inorganic/organic calcium carbonate microparticles are dry prior to loading with the at least one drilling fluid additive.

13. An aqueous drilling fluid comprising:

water; and a plurality of loaded microparticles made by the process of absorbing at least one organic drilling fluid additive onto hybrid inorganic/organic calcium carbonate microparticles to form the loaded microparticles, where the hybrid inorganic/organic calcium carbonate microparticles are made by precipitating calcium carbonate in the presence of an amphiphilic crystal growth modifier that is a surfactant.

14. The aqueous drilling fluid of claim 13 where the average particle size of the hybrid inorganic/organic calcium carbonate microparticles ranges from about 1 to about 100 microns.

15. The aqueous drilling fluid of claim 13 where the specific surface area of the hybrid inorganic/organic calcium carbonate microparticles ranges from about 1 to about 50 $m^2/g$.

16. The aqueous drilling fluid of claim 13 where the loading of at least one drilling fluid additive on the hybrid inorganic/organic calcium carbonate microparticles ranges from about 1% to about 50% w/w based on the hybrid calcium carbonate microparticles.

17. The aqueous drilling fluid of claim 13 where the hybrid inorganic/organic calcium carbonate microparticles are dry prior to loading with the at least one drilling fluid additive.

18. The aqueous drilling fluid of claim 13 where the at least one organic drilling fluid additive is selected from the group consisting of lubricants, shale stabilizers, wellbore stabilizers, corrosion inhibitors, oxygen scavengers, ROP enhances, anti-bit balling additives, anti-accretion additives, and combinations thereof.

* * * * *